US012752598B2

(12) United States Patent
Kim et al.

(10) Patent No.: US 12,752,598 B2
(45) Date of Patent: *Oct. 6, 2026

(54) THERMAL MANAGEMENT SYSTEM FOR A VEHICLE

(71) Applicants: HYUNDAI MOTOR COMPANY, Seoul (KR); KIA CORPORATION, Seoul (KR)

(72) Inventors: Jae Woong Kim, Hwaseong-si (KR); Dae Ki Hong, Hwaseong-si (KR); Seok Jin Hong, Hwaseong-si (KR); Ki Hoon Kim, Ansan-si (KR); Jae Kwon Lee, Hwaseong-si (KR); Se Kyu Oh, Guri-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 141 days.

This patent is subject to a terminal disclaimer.

(21) Appl. No.: 18/819,809

(22) Filed: Aug. 29, 2024

(65) Prior Publication Data

US 2025/0289286 A1 Sep. 18, 2025

(30) Foreign Application Priority Data

Mar. 14, 2024 (KR) ........................ 10-2024-0035949

(51) Int. Cl.
*B60H 1/00* (2006.01)

(52) U.S. Cl.
CPC ..... *B60H 1/00899* (2013.01); *B60H 1/00278* (2013.01); *B60H 1/00392* (2013.01); *B60H 2001/00307* (2013.01)

(58) Field of Classification Search
CPC .............. B60H 1/0073; B60H 1/00921; B60H 1/00271; B60H 1/00278
See application file for complete search history.

(56) References Cited

U.S. PATENT DOCUMENTS

| | | | |
|---|---|---|---|
| 10,814,696 B2 | 10/2020 | Tominaga | |
| 2009/0183697 A1 | 7/2009 | Inui | |
| 2017/0326945 A1 | 11/2017 | Hatakeyama | |
| 2022/0281290 A1* | 9/2022 | Hirabayashi | B60H 1/3202 |

FOREIGN PATENT DOCUMENTS

| | | | | |
|---|---|---|---|---|
| CN | 115071367 A * | 9/2022 | | B60H 1/00392 |
| JP | 2007303435 A | 11/2007 | | |
| JP | 2023091441 A | 6/2023 | | |
| KR | 101950750 B1 | 2/2019 | | |
| KR | 20220068374 A | 5/2022 | | |

* cited by examiner

*Primary Examiner* — Eric S Ruppert
(74) *Attorney, Agent, or Firm* — Lempia Summerfield Katz LLC

(57) ABSTRACT

A thermal management system for a vehicle includes a fluid transfer device including a power consumption unit configured to consume power for performing the heat pump function and includes a control unit configured to control the fluid transfer device based on an optimal control value.

20 Claims, 4 Drawing Sheets

THERMAL MANAGEMENT SYSTEM FOR A VEHICLE

CROSS-REFERENCE TO RELATED APPLICATION

The present application claims priority to Korean Patent Application No. 10-2024-0035949, filed on Mar. 14, 2024, the entire contents of which are incorporated herein for all purposes by this reference.

BACKGROUND

Field of the Disclosure

The present disclosure relates to a thermal management system for a vehicle for performing thermal management of the vehicle based on an optimal control value through a predictive model.

Description of the Related Art

Recently, because there is increasing interest in environment, the number of environmental-friendly vehicles using electric motors as power sources increases. The environmental-friendly vehicle is called an electrified vehicle. The representative examples of the environmental-friendly vehicles include a hybrid electric vehicle (HEV) or an electric vehicle (EV). Because these electric vehicles consume electricity not only for traveling, but also for indoor air conditioning, the efficiency of the indoor air conditioning has a significant effect on the electricity cost of the vehicle and the overall energy efficiency that includes the electricity cost of the vehicle.

In particular, among the electrified vehicles, in the case of electric vehicles that are not provided with an engine and are traveling only through the driving force of a motor, energy efficiency is even more required because the waste heat of the engine cannot be recovered and used for indoor air conditioning.

In addition, the electrified vehicles have components, such as a high-voltage battery, motor, and the like for driving. Because the operation performance of these components is affected by temperature, the requirements for the components as well as the indoor air conditioning in terms of thermal management are increasingly needed in consideration.

Therefore, in order to optimally perform the thermal management of the vehicle to improve the energy efficiency of the entire vehicle, it is necessary to generally take into consideration the constraint on each vehicle part, the indoor air conditioning targets, and the like.

The foregoing explained as the background is intended merely to aid in the understanding of the background of the present disclosure and is not intended to mean that the present disclosure falls within the purview of the related art that is already known to those having ordinary skill in the art.

SUMMARY

The present disclosure is directed to a thermal management system for a vehicle that is capable of performing integrated thermal management of an entire vehicle in consideration of both an air conditioning target and a constraint for thermal management of vehicle parts.

Technical problems of the present disclosure are not limited to the aforementioned technical problems, and other technical problems, which are not mentioned above, may be clearly understood by those having ordinary skill in the art from the following descriptions.

There is provided a thermal management system for a vehicle according to one embodiment of the present disclosure to achieve the aforementioned objects. The thermal management system for a vehicle may include a fluid transfer device configured to perform a heat pump function of exchanging heat with at least one vehicle part to selectively recover waste heat of the vehicle part and discharging air into a vehicle interior to perform indoor heating. The fluid transfer device includes a power consumption unit configured to consume power for performing the heat pump function. The thermal management system for the vehicle also includes a control unit configured to control the fluid transfer device based on an optimal control value derived using a control model for a predicted state value according to a current state value. The optimal control value may be a control value that allows the fluid transfer device to create a target discharge air temperature for indoor heating while consuming minimum power through the power consumption unit and satisfying a constraint for recovering the waste heat of the at least one vehicle part.

In an embodiment, at least one of an effect according to a current control value or an effect of a disturbance on a current output value may be further reflected in the control model for the predicted state value.

In an embodiment, the control unit may derive the optimal control value based on a target value that enables the fluid transfer device to perform the indoor heating with minimum power consumption through the power consumption unit. The target value may be determined based on a power consumption according to a state value and a control value and a control model for an output value.

In an embodiment, the target value may be determined in a normal state where there is no change in the state value.

In an embodiment, the control unit may determine a control value that allows a cost function for a preset prediction range to be minimized. The cost function may include a state cost having a weight on the state value and a control input cost having a weight on the control value.

In an embodiment, at least one of a final state cost having a weight on a final state value of the preset prediction range or a cost on an amount of change of control having a weight on an amount of change of the control value may be further reflected in the cost function.

In an embodiment, the optimal control value may be derived from a dynamic state where there is a change in the state value.

In an embodiment, the optimal control value may be a physical quantity that affects the indoor heating of the vehicle according to a result of an operation of the power consumption unit. The control unit may convert the optimal control value into an operational quantity that determines the operation of the power consumption unit. The control unit may control the power consumption unit based on the operational quantity.

In an embodiment, the power consumption unit may include a coolant pump configured to flow coolant that cools the vehicle parts and a compressor configured to compress and discharge refrigerant that recovers the waste heat of the at least one vehicle part through the coolant. The optimal control value may include a mass flow rate of the coolant through the coolant pump and a mass flow rate of the refrigerant through the compressor.

In an embodiment, the power consumption unit may include a heater configured to heat air discharged into a vehicle interior of the vehicle. The optimal control value may further include power consumption of the heater.

In an embodiment, the fluid transfer device may selectively absorb heat from air outside the vehicle according to a result of a waste heat recovery of the vehicle parts. The power consumption unit may further include a fan configured to introduce air outside the vehicle into the fluid transfer device. The optimal control value may further include a mass flow rate of the outside air introduced into the fluid transfer device.

In an embodiment, the current state value and the predicted state value may include a temperature of air discharged into the vehicle interior and a temperature of refrigerant circulating within the fluid transfer device to recover the waste heat of the at least one vehicle part.

In an embodiment, the current state value and the predicted state value may further include a state value on the temperature of the vehicle part.

In an embodiment, the vehicle parts may include a battery provided in the vehicle and configured to store power. The constraint for recovering the waste heat of the vehicle parts may include a condition on operation performance of the battery that is determined to be satisfied based on a cell temperature of the battery.

In an embodiment, the vehicle parts may include a motor provided in the vehicle and configured to provide a driving force for traveling. The constraint for recovering the waste heat of the vehicle parts may include a condition on viscosity of oil of the motor that is determined to be satisfied based on a temperature of the oil of the motor.

In an embodiment, the vehicle parts may include a motor provided in the vehicle and configured to provide a driving force for traveling. The constraint for recovering the waste heat of the vehicle parts may include a condition on operation performance of the motor that is determined to be satisfied based on a winding temperature of the motor.

In an embodiment, the vehicle parts may include an inverter provided in the vehicle and configured to perform power conversion. The constraint for recovering the waste heat of the vehicle parts may include a condition on operation performance of the inverter that is determined to be satisfied based on a temperature of an element driving the inverter.

In an embodiment, the vehicle parts may include a controller provided in the vehicle and configured to perform control of performing a specific function. The constraint for recovering the waste heat of the vehicle parts may include a condition on operation performance of the controller that is determined to be satisfied based on a temperature of the controller.

In an embodiment, the fluid transfer device may further include an opening and closing device configured to regulate air flow inside the fluid transfer device according to an amount of opening. The control unit may control the amount of opening of the opening and closing device based on a temperature of air discharged into the vehicle interior.

In an embodiment, the control unit may perform thermal management for the at least one vehicle part together by adjusting a heat transfer path between the fluid transfer device and the vehicle part based on a temperature of the vehicle part.

According to various embodiments of the present disclosure as described above, it is possible to efficiently consume energy and achieve the indoor heating target by controlling the indoor heating in consideration of the waste heat recovery of the vehicle parts. Thus, the electricity efficiency of the vehicle and the traveling distance with respect to a charging amount may be increased.

In addition, in performing the indoor heating as described above, since the constraint for the thermal management of the vehicle parts is reflected, the requirements in terms of thermal management for the vehicle parts can be satisfied.

The effects capable of being obtained by the present disclosure are not limited to the aforementioned effects, and other effects, which are not mentioned above, should be clearly understood by those having ordinary skill in the art from the following description.

DETAILED DESCRIPTION OF THE DISCLOSURE

Figure 1:
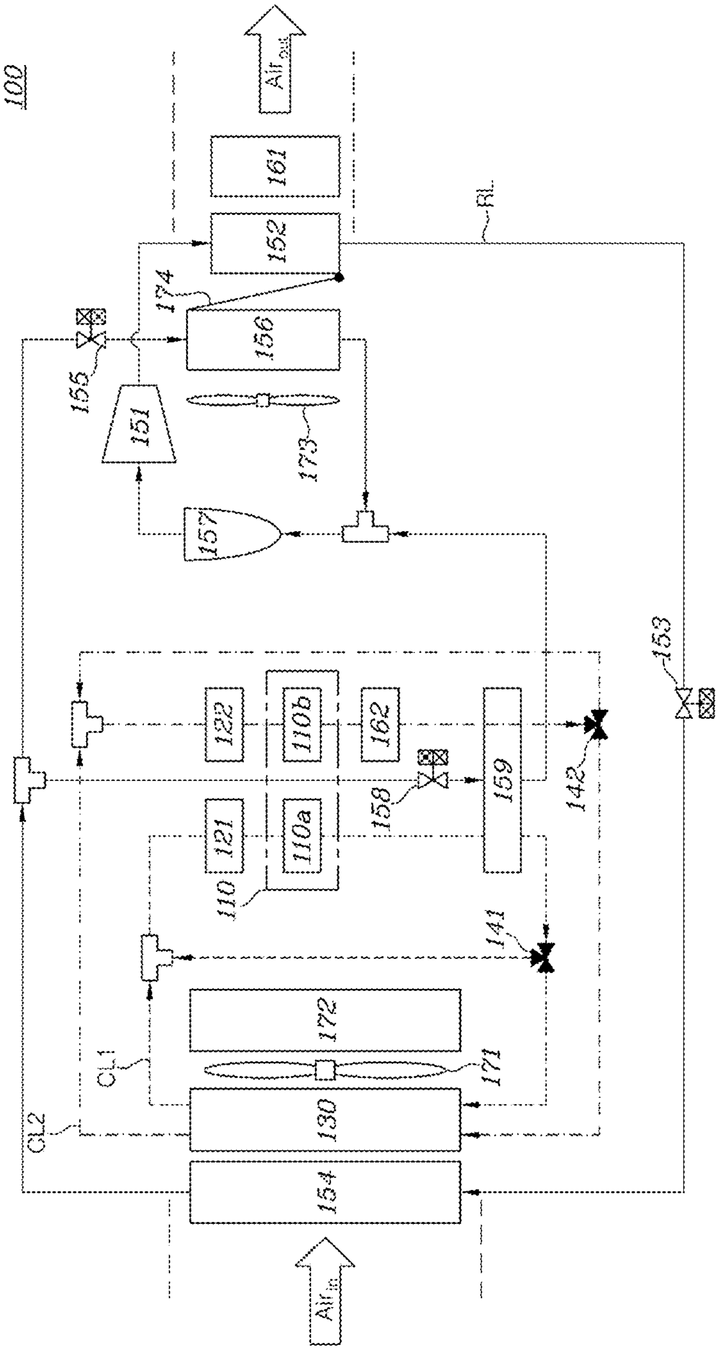
FIG. 1 is a view illustrating an example of a configuration of a fluid transfer device of a thermal management system that is applicable to embodiments of the present disclosure.

Specific structural or functional descriptions of embodiments of the present disclosure disclosed in the present disclosure are exemplified only for the purpose of explaining the embodiments according to the present disclosure, the embodiments according to the present disclosure may be carried out in various forms. It should not be interpreted that the present disclosure is limited to the embodiments described in the present disclosure.

Because the embodiments according to the present disclosure may be variously changed and may have various forms, specific embodiments are illustrated in the drawings and described in detail in the present disclosure. However, the descriptions of the specific embodiments are not intended to limit embodiments according to the concept of the present disclosure to the specific embodiments. However, it should be understood that the present disclosure covers all modifications, equivalents, and alternatives falling within the spirit and technical scope of the present disclosure.

Unless otherwise defined, all terms used herein, including technical or scientific terms, have the same meaning as commonly understood by those having ordinary skill in the art to which the present disclosure pertains. The terms, such as those defined in commonly used dictionaries, should be interpreted as having meanings consistent with meanings in the context of related technologies and should not be interpreted as ideal or excessively formal meanings unless explicitly defined in the present disclosure.

Hereinafter, embodiments disclosed in the present disclosure are described in detail with reference to the accompanying drawings. The same or similar constituent elements are assigned with the same reference numerals regardless of reference numerals, and the repetitive description thereof have been omitted.

In the description of the following embodiments, the term "preset" means that when a parameter is used in a process or algorithm, a value of the parameter is predetermined. The value of the parameter may be set at the beginning of the process or algorithm, according to embodiments or may be set during an interval in which the process or algorithm is performing.

The suffixes “module”, “unit”, “part”, and “portion” used to describe constituent elements in the following description are used together or interchangeably in order to facilitate the description, but the suffixes themselves do not have distinguishable meanings or functions. When a “module”, “unit”, “part”, “portion”, or the like of the present disclosure is described as having a purpose or performing an operation, function, or the like, the “module”, “unit”, “part”, “portion”, or the like should be considered herein as being “configured to” meet that purpose or to perform that operation or function. Each “module”, “unit”, “part”, “portion”, and the like may separately embody or be included with a processor and a memory, such as a non-transitory computer readable media, as part of the apparatus.

In the description of the embodiments disclosed in the present disclosure, the specific descriptions of publicly known related technologies have been omitted when it is determined that the specific descriptions may obscure the subject matter of the embodiments disclosed in the present disclosure. In addition, it should be interpreted that the accompanying drawings are provided only to allow those having ordinary skill in the art to easily understand the embodiments disclosed in the present disclosure. The technical spirit disclosed in the present disclosure is not limited by the accompanying drawings and includes all alterations, equivalents, and alternatives that are included in the spirit and the technical scope of the present disclosure.

The terms including ordinal numbers, such as “first,” “second,” and the like, may be used to describe various constituent elements, but the constituent elements are not limited by the terms. These terms are used only to distinguish one constituent element from another constituent element.

When one constituent element is described as being “coupled” or “connected” to another constituent element, it should be understood that one constituent element can be coupled or connected directly to another constituent element. An intervening constituent element can also be present between the constituent elements. When one constituent element is described as being “coupled directly to” or “connected directly to” another constituent element, it should be understood that no intervening constituent element is present between the constituent elements.

Singular expressions include plural expressions unless clearly described as different meanings in the context.

In the present disclosure, it should be understood the terms, such as “comprises,” “comprising,” “includes,” “including,” “containing,” “has,” “having” or other variations thereof, are inclusive and therefore specify the presence of stated features, integers, steps, operations, elements, components, or combinations thereof. However, the terms do not preclude the presence or addition of one or more other features, integers, steps, operations, elements, components, or combinations thereof.

In addition, the term “control unit” or “unit” included in the name of “motor control unit (MCU)” or “hybrid control unit (HCU)” is merely a term widely used to name a control device (controller or control unit) for controlling a particular vehicle function but does not mean a generic function unit.

A controller may include a communication device configured to communicate with another control unit or a sensor to control a corresponding function. The controller may also include a memory configured to store an operating system, a logic instruction, and input/output information. The controller may also include one or more processors configured to perform determination, computation, decision, or the like required to control the corresponding function.

Hereinafter, before describing the operation of a control unit for performing thermal management for a vehicle according to one embodiment of the present disclosure, an implementation example of a fluid transfer device applicable to the embodiments of the present disclosure is first described with reference to FIG. 1.

FIG. 1 is a view illustrating an example of a configuration of a fluid transfer device of a thermal management system that is applicable to embodiments of the present disclosure.

With reference to FIG. 1, a fluid transfer device 100 may be applicable to the embodiments of the present disclosure and may perform thermal management for a vehicle, such as cooling or heating of at least one vehicle part 110, air conditioning of a vehicle interior (cabin), and the like.

To this end, the fluid transfer device 100 may be provided with coolant lines CL1, CL2 that exchange heat with the vehicle parts 110, and the fluid transfer device 100 may also be provided with a refrigerant line RL that exchanges heat with coolant and ambient air.

More specifically, the fluid transfer device 100 may be provided with a plurality of coolant lines CL1 and CL2, and each of the coolant lines CL1 and CL2 may individually exchange heat with each vehicle part 110 for thermal management of the different vehicle parts 110.

Here, the vehicle parts 110 may include a drive train 110*a*, such as a motor and an inverter, and a battery 110*b*. However, in the embodiments of the present disclosure, the vehicle parts 110 are not necessarily limited to the examples as described above and may include a variety of components that require heat dissipation. For example, the vehicle parts 110 may include various types of controllers, such as an autonomous driving controller, a motor controller, a vehicle controller, and a controller involved in performing integrated thermal management according to one embodiment of the present disclosure.

While FIG. 1 illustrates the coolant line CL1 for thermal management of the drive train 110*a* and the coolant line CL2 for thermal management of the battery 110*b*, in the implementation of the fluid transfer device 100, such coolant lines CL1 and CL2 may be replaced by coolant lines for thermal management of other vehicle parts 110, such as a controller or may coexist with coolant lines for thermal management of other vehicle parts 110. In addition, the implementation examples of the fluid transfer device 100 may include various cases, such as a case in which only a single coolant line is provided for thermal management of any one vehicle part 110, a case in which a plurality of vehicle parts 110 are connected in series to one coolant line, and the like.

Each of the coolant lines CL1 and CL2 may be provided with pumps 121 and 122 for circulation of the coolant, and the pumps 121 and 122 may consume power to allow the coolant to flow toward the vehicle part 110. These pumps 121 and 122 may be implemented, for example, as an electric water pump (EWP) that drives a motor through electrical energy to circulate the coolant.

The coolant introduced toward the vehicle parts 110 through the pumps 121 and 122 may absorb heat generated from the vehicle parts 110 through heat exchange while passing through the vehicle parts 110, and accordingly, cooling of the vehicle parts 110 may be achieved.

The coolant that has passed through the vehicle parts 110 may flow toward a radiator 130, and in the process of passing through the radiator 130, the coolant releases heat absorbed from the vehicle parts 110 to the surroundings and is introduced back toward the vehicle parts 110.

In this case, the radiator 130 may be provided individually for each of the coolant lines CL1 and CL2, and the radiator 130 corresponding to each of the coolant lines CL1 and CL2 may be divided into, for example, a high temperature radiator and a low temperature radiator.

The refrigerant line RL may be provided with a compressor 151, a plurality of condensers 152 and 154, a plurality of expanders 153, 155, and 158, an evaporator 156, an accumulator 157, and a heat absorber 159, through which the fluid transfer device 100 may perform a heat pump function.

Here, the compressor 151 may discharge the refrigerant in a state of high temperature and high pressure by consuming power to implement the heat pump function through circulation of the refrigerant. The refrigerant that has passed through the compressor 151 passes through the indoor side condenser 152, the expander 153, the outdoor side condenser 154, the expander 155, the evaporator 156, and the accumulator 157 to repeatedly dissipate and absorb heat on the surroundings.

In particular, the refrigerant line RL may be routed via the coolant lines CL1 and CL2 to recover waste heat of the vehicle parts 110 from the coolant lines CL1 and CL2 and may exchange heat with the coolant lines CL1 and CL2 through the heat absorber 159 connected to the coolant lines CL1 and CL2. Meanwhile, the fluid transfer device 100 may be provided with a plurality of heat absorbers 159 unlike those illustrated in FIG. 1, and the plurality of heat absorbers 159 may be connected to different coolant lines CL1 and CL2.

Meanwhile, in order to perform thermal management for a vehicle of different purposes, the fluid transfer device 100 may form various heat transfer paths through the coolant lines CL1 and CL2.

For example, the coolant line CL1 for thermal management of the drive train 110*a* may form a heat transfer path that releases heat absorbed from the drive train 110*a* to the outside through the radiator 130 and a heat transfer path that transfers heat absorbed from the drive train 110*a* to the refrigerant line RL through the heat absorber 159. These heat transfer paths may be formed simultaneously.

The heat transfer path as above may be variable according to a flow direction of the coolant, and the flow direction of the coolant may be regulated by a valve 141 provided in the coolant line CL1 and the like. Further, the circulation of the coolant may be inhibited through stopping an operation of the pump 121 and the like so that heat generated from the drive train 110*a* does not escape through the radiator 130 or the heat absorber 159.

As another example, the coolant line CL2 for thermal management of the battery 110*b* may form a heat transfer path that releases heat absorbed from the battery 110*b* to the outside through the radiator 130 and a heat transfer path that does not go through the radiator 130. In particular, in the heat transfer path that does not go through the radiator 130, according to the circulation of the refrigerant in the refrigerant line RL, the heat generated from the battery 110*b* may be transferred to the refrigerant line RL through the heat absorber 159 to cool the battery 110*b*. Alternatively, the heat from the temperature-raised coolant may be transferred to the battery 110*b* through a heater 162, which heats the coolant instead of transferring heat to the refrigerant line RL, to raise the temperature of the battery 110*b*. The heat transfer path as above may be variable according to a flow direction of the coolant, and the flow direction of the coolant may be regulated by a valve 142 provided in the coolant line CL2 and the like.

Among the heat transfer paths as described above, the fluid transfer device 100 may recover heat generated from the vehicle parts 110, i.e., waste heat, through the heat transfer path of transferring the heat absorbed from the vehicle parts 110 to the refrigerant line RL through the heat absorber 159. The fluid transfer device 100 may recycle the waste heat for indoor thermal management and the like. Thus, the energy efficiency of thermal management of the vehicle may be improved.

Meanwhile, the fluid transfer device 100 may also exchange heat with the outside air and may use the heat absorbed through heat exchange from the outside air for thermal management. More specifically, the heat exchange with the outside air may be performed indirectly through the radiator 130 but may also be performed through an external evaporator that absorbs heat from the outside air.

In performing such thermal management, the fluid transfer device 100 may regulate air flow from exterior to interior and may be provided with a blowing device, an opening and closing device, and the like for regulating air flow.

The blowing device may include, for example, a cooling fan 171 for regulating the introduction of outdoor air and a blower 173 for regulating the discharge of air into the vehicle interior. The opening and closing device may include, for example, an air flap 172 for regulating the introduction of outdoor air and a temp door 174 for regulating the discharge of air into the interior. The blowing device and the opening and closing device as described above may consume power to perform their operations.

In addition, the fluid transfer device 100 may include an electric heating device to raise the temperature of the air or coolant. The electric heating device may include a heater 161 for heating air discharged into the vehicle interior, in which case the heater 161 may be implemented as, for example, a positive temperature coefficient (PTC) heater. In addition, the electric heating device may include a heater 162 that heats the coolant to raise the temperature of the battery 110*b* as described above.

According to the structure of the fluid transfer device 100 as described above, the thermal management for a vehicle may be performed in various methods, and in particular, various thermal management scenarios may be derived according to a state of the vehicle interior, a state of the vehicle exterior, a state of the vehicle parts 110*a* and 110*b*, and the like.

Meanwhile, while FIG. 1 mainly illustrates constituent elements associated with the description of the fluid transfer device 100 applicable to the embodiments of the present disclosure, the actual fluid transfer device 100 may be implemented including more or fewer configurations.

In addition, because the fluid transfer device 100 described so far with reference to FIG. 1 represents one implementation example applicable to the embodiments of the present disclosure, the fluid transfer device 100 according to the embodiments of the present disclosure is not necessarily limited to those described above.

Figure 2:
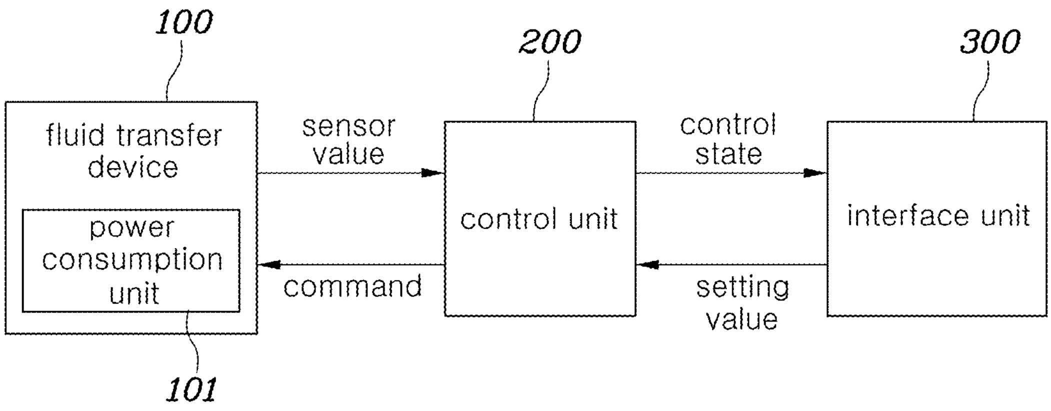
FIG. 2 is a view illustrating a configuration of a thermal management system for a vehicle according to one embodiment of the present disclosure.

FIG. 2 is a view illustrating a configuration of the thermal management system for a vehicle according to one embodiment of the present disclosure.

With reference to FIG. 2, another thermal management system for a vehicle according to one embodiment of the present disclosure may include a fluid transfer device 100, a control unit 200, and an interface unit 300. However, while FIG. 2 mainly illustrates constituent elements associated with the description of one embodiment of the present disclosure, an actual thermal management system may be implemented to include more or fewer constituent elements.

Here, the fluid transfer device 100 may be implemented as in the example described with reference to FIG. 1. The control unit 200 may be implemented with an algorithm for performing a thermal management function for a vehicle, a memory configured to store data on software commands executing such algorithm, a processor configured to use the data stored in the memory to perform the operations described below, a controller having the algorithm, memory, and processor, and the like.

In this case, the control unit 200 may be implemented through one integrated controller or may be implemented as a work function of a specific controller provided in the vehicle. In addition, the control unit 200 may be implemented through a combination of a plurality of controllers, for example, a combination of high-level a controller that performs determinations or calculations required for the thermal management for a vehicle and generates control commands and a low-level controller that receives the control commands from the high-level controller to control the configurations of the fluid transfer device 100, respectively.

The interface unit 300 may receive a setting value and the like as input from a vehicle user such as a driver and may transmit the setting value to the control unit 200. The interface unit 300 may receive information on a control state and the like from the control unit 200 and may express the control state in a visual and audible manner or the like. To this end, the interface unit 300 may be implemented as a cluster of vehicles, an audio, video, navigation, and telematics (AVNT) device, and the like or may be implemented as a terminal of a vehicle user, such as a driver.

Meanwhile, the control unit 200 according to one embodiment may perform optimal control for thermal management for a vehicle, which is described below with reference to FIG. 3.

Figure 3:
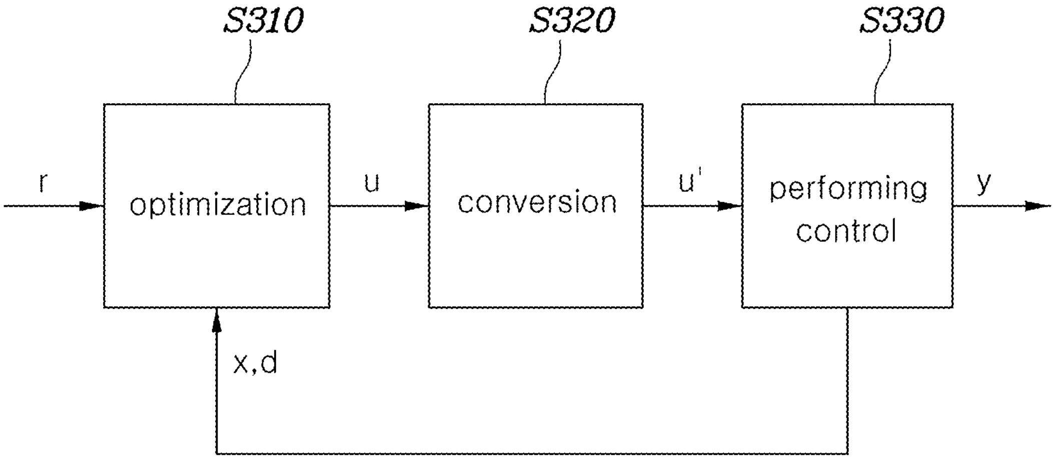
FIG. 3 is a view for describing an optimal control process of a control unit according to one embodiment of the present disclosure.

FIG. 3 is a view for describing an optimal control process of the control unit according to one embodiment of the present disclosure.

With reference to FIG. 3, the control unit 200 according to one embodiment of the present disclosure may perform thermal management for a vehicle through processes of optimizing S310, converting S320, and performing control S330.

First, the optimization S310 may be performed in a model-based manner. For example, a proportional, integral, and differential (PID) control, a linear quadratic regulator (LQR) control, and the like may be used for the optimization. In particular, the optimization S310 according to one embodiment of the present disclosure may be performed through a model-based predictive control (MPC).

More specifically, the optimization process S310 through the model-based predictive control may be performed in a direction of reducing a future error in deriving an optimal control value u that basically causes an output value y to follow a target value r.

To this end, the optimal control value u may be derived using a control model for a predicted state value according to a current state value x. In other words, the optimal control value u may be derived in consideration of not only the current state, but also the predicted future state.

In addition to the current state value x, at least one of the current control value u or a disturbance d may be further reflected in the control model for the predicted state value and may be expressed as, for example, the equation below.

$$x_{k+1} = A_k x_k + B_k u_k + B_{w,k} w_k + B_{\phi,k}$$

In the equation above, $x_k$ and $x_{k+1}$ mean a current state value and a predicted state value, and $w_k$ means a disturbance. Each of $A_k$, $B_k$, and $B_{w,k}$ represent an effect of a current state, a control input, and a disturbance on a future state, and $B_{\phi,k}$ is a term to reflect the uncertainty of the prediction.

The predicted future state may be reflected in the derivation of the optimal control value using the control model for the predicted state value as described above.

Meanwhile, the optimization process S310 may also involve optimization on the target value r prior to the derivation of the optimal control value u. In this case, the optimization on the target value r may be performed in a normal state, and a control model for the output value may be used here. Here, the control model for the output value represents an output value according to a current state value and a current control value, which may be expressed, for example, as the equation below.

$$\begin{bmatrix} A_k - I & B_k \\ C_k & 0 \end{bmatrix} \begin{bmatrix} x_{ss} \\ u_{ss} \end{bmatrix} = \begin{bmatrix} -(B_{w,k} w_k + B_{\phi,k}) \\ r \end{bmatrix}$$

Here, $X_{SS}$ and $U_{SS}$ mean a state value and a control value in a normal state, and $W_K$ means a disturbance. Each of $A_k$, $B_k$ and $B_{w,k}$ represents an effect of a current state, a control input, and a disturbance on a future state, $C_k$ represents an effect of a state value on an output value, and r may mean a target value, i.e., an output value that is a target for control. $B_{\phi,k}$ is a term to reflect the uncertainty of the prediction.

In contrast, in one embodiment, the process of optimizing the target value r in the normal state may be omitted. In this case, the optimization may be performed so that the output value follows the target value in a dynamic state in which there is a change in the state value.

Meanwhile, in the optimization process S310 through the model-based predictive control, the optimal control value u may be derived through a cost function on a preset prediction range.

Here, the preset prediction range refers to how far into the future the prediction is to be made, which may be expressed as a prediction horizon. As the prediction range increases, the performance of the optimization may be improved. However, a calculation load on the control unit 200 for the prediction may increase as much as the prediction range increases.

In one embodiment, the optimal control value may be determined as a control value such that a cost function is minimized over the preset prediction range as described above. In this case, the cost function may reflect a state cost having a weight on the state value and a control input cost having a weight on the control value. Further, a final state cost having a weight on a final state value of the prediction range and a cost on an amount of change of control with a weight on an amount of change in the control value may be further taken into consideration. The cost function as described above may be expressed as, for example, the equation below.

$$J(U_k) = x_N^T Q_f x_N + \sum_{i=0}^{N-1} \left( \|x_{k+i} - x_{ss,k}\|_Q^2 + \|u_{k+i} - u_{ss,k}\|_R^2 + \|\Delta u_{k+i}\|_{R_{du}}^2 \right)$$

Here, $J(U_k)$ is a cost function, and an optimal control value may be determined as a control value corresponding to a current occasion, among control values ($U_k$) that causes $J(U_k)$ to be minimized.

$x_{k+i}$ and $x_{ss,k}$ correspond to a predicted state value on the prediction range and a target state value to ensure that the target value r is output, respectively, and in the control process through the optimal control value u, $x_{k+i}$ changes in a direction of following $x_{ss,k}$. Here, $$\|x_{k+i} - x_{ss,k}\|_Q^2$$

is a term to reflect a cost on the state value, which is related to a rate at which the predicted state value reaches the target state value, and as a weight Q is larger, the rate at which the predicted state value reaches the target state value is faster. In other words, as the weight Q has a larger value, the control target following performance may be improved and the control target may be achieved faster.

$u_{k+i}$ and $u_{ss,k}$ correspond to a predicted control value on the prediction range and a target control value to ensure that the target value r is output, respectively, and in the control process through the optimal control value u, $u_{k+i}$ changes in a direction of following $u_{ss,k}$. Here, $$\|u_{k+i} - u_{ss,k}\|_R^2$$

is a term to reflect a cost on the control value, which is related to a rate at which the predicted control value reaches the target control value, and as the weight R is larger, the energy consumed in the process in which the predicted state value reaches the target state value may be reduced. In other words, as the weight R has a larger value, the energy performance of the control is improved, so that the control target may be achieved with less energy.

Meanwhile, $x_N$ means a final state value of the preset prediction range, and $Q_f$ represents a weight on the final state value. Here, $$x_N^T Q_f x_N$$

is a term to reflect a cost on a final state, which may be applied to ensure the stability of the prediction through a finite prediction range.

$$\|\Delta u_{k+i}\|_{R_{du}}^2$$

is a term to reflect a cost on an amount of change in the control value, and $R_{du}$ represents a weight on the amount of change in the control value. The cost on the amount of change in the control value may be applied to limit the excessive change in the control value in the process of following the target value.

Meanwhile, the control value may be optimized in a dynamic state where the state value x is changing. In other words, the optimal control value u may be derived from the dynamic state. In this case, both the target value r and the optimal control value u may be optimized in the dynamic state (i.e., stage 1), or the target value r may be optimized in the normal state and the optimal control value u may be optimized in the dynamic state (i.e., stage 2).

The optimal control value u derived as described above may be a physical quantity that affects thermal management for a vehicle according to the operation of each configuration of the fluid transfer device 100, for example, a mass flow rate of the refrigerant, a mass flow rate of the coolant, or a mass flow rate of air, and the like. In this case, the control unit 200 may convert the optimal control value u derived as a physical quantity through the conversion process S320 into an operational quantity u', such as a rotational speed, a duty, and the like, to control the operation of the configuration of the fluid transfer device 100. However, the optimum control value u is not necessarily limited to the form as above and may have various forms according to the respective configuration of the fluid transfer device 100. In this case, the conversion process S320 may be omitted when the conversion to the operational quantity is unnecessary.

After the optimization S310 and conversion S320 as described above have been performed, substantial control of the configurations of the fluid transfer device 100 may be performed according to the optimal control value u and the operational quantity u' according thereto, and the result of performing the control may be represented in the form of the output value y. In this case, the output value y may be collected through various kinds of sensors provided in the vehicle, and may be transferred back to the control unit 200 after being converted to a physical quantity as necessary. In this case, the control unit 200 may determine the current state x and the disturbance d according to the output value y, which may be reflected back to the optimization S310.

With reference back to FIG. 2, it is proposed that a thermal management system for a vehicle according to one embodiment of the present disclosure performs thermal management for a vehicle based on the optimal control value that allows the fluid transfer device 100 to consume minimum power through a power consumption unit 101 and create a target discharge air temperature for indoor heating while satisfying a constraint for recovering waste heat of the vehicle parts 110. Thus, the energy efficiency of the thermal management for a vehicle may be improved.

To this end, the thermal management system for a vehicle according to one embodiment may include a fluid transfer device 100 provided with a heat pump function of selectively recovering waste heat of the vehicle parts 110 by exchanging heat with the at least one vehicle part 110 and performing indoor heating by discharging air into the vehicle interior. The fluid transfer device 100 may include a power consumption unit 101 that consumes power for performing the heat pump function. The thermal management system may also include a control unit that controls the fluid transfer device 100 based on an optimal control value derived using a control model for a predicted state value according to a current state value.

Here, the optimal control value may be a control value that allows the fluid transfer device 100 to consume minimum power through the power consumption unit 101 and create a target discharge air temperature for indoor heating while satisfying the constraint for recovering waste heat from the vehicle parts 110.

The fluid transfer device 100 may be implemented, for example, as the example described with reference to FIG. 1, and the power consumption unit 101 may include configurations that operate through power consumption, such as the pumps 121 and 122, the compressor 151, the cooling fan 171, the heater 161, and the like described above.

The control unit 200 may derive the optimal control value based on the target value that enables the fluid transfer device 100 to perform indoor heating while consuming minimum power through the power consumption unit 101. The target value may be determined based on a control model for the power consumption and output value according to the state value and the control value. The control model described above with reference to FIG. 2 may be applied to the control model on the output value according to the state value and the control value. The power consumption according to the state value and the control value may be applied in the form of a cost function that enables the power consumption according to the state value and the control value to be minimized, for example, in the form of the equation below.

$$[x_{ss}u_{ss}]^T=\min_{x_{ss}u_{ss}}\Sigma P_j$$

Here, $X_{SS}$ and $U_{SS}$ are a state value and a control value for reaching the control target, which may be derived through the normal state optimization as described above, and $P_j$ may mean the power consumption determined according to the state value and the control value.

Meanwhile, in one embodiment, the power consumption unit 101 may include the coolant pumps 121 and 122 that flow the coolant that cools the vehicle parts and the compressor 151 that compresses and discharges the refrigerant that recovers the waste heat of the vehicle parts through the coolant. In this case, the optimal control value may include a mass flow rate of the coolant passing through the coolant pumps 121 and 122 and a mass flow rate of the refrigerant passing through the compressor 151.

Further, the power consumption unit 101 may include a heater 161 that heats air discharged into the vehicle interior. In this case, the optimal control value may further include power consumption of the heater 161.

Meanwhile, the fluid transfer device 100 may selectively absorb heat from air outside the vehicle according to the result of the waste heat recovery of the vehicle parts 110. To this end, the power consumption unit 101 may include the fan 171 that introduces air outside the vehicle into the fluid transfer device. In this case, the optimal control value may include a mass flow rate of outside air introduced into the fluid transfer device 100.

The current state value and the predicted state value may include a temperature of air discharged into the vehicle interior and a temperature of the refrigerant circulating within the fluid transfer device 100 to recover waste heat from the vehicle parts 110. The current state value and the predicted state value may further include a state value on the temperature of the vehicle parts 110. The state value on the temperature of the vehicle parts 110 may include, for example, a winding temperature of the motor, an oil temperature of the motor, a battery cell temperature, and the like.

Meanwhile, in one embodiment, the control unit 200 derives the optimal control value by reflecting the constraint for recovering the waste heat of the vehicle parts 110, in which the constraint for recovering the waste heat of the vehicle parts 110 may be variously set for each vehicle part 110.

More specifically, when the vehicle part 110 includes a motor provided in the vehicle among the drive train **110*a* to provide driving force for traveling, the constraint for recovering the waste heat of the vehicle parts 110** may include a condition on the viscosity of an oil of the motor that is determined to be satisfied based on the oil temperature of the motor.

For example, when the vehicle part 110 includes a motor provided in the vehicle among the drive train **110*a* to provide driving force for traveling, the constraint for recovering the waste heat of the vehicle parts 110** may include a condition on the viscosity of an oil of the motor that is determined to be satisfied based on the oil temperature of the motor.

For example, the condition on the viscosity of the oil of the motor may include a condition that is satisfied when the temperature of the oil of the motor is higher than a preset lowest temperature of the motor oil. The condition on the viscosity of the oil of the motor may also include a condition that is satisfied when the temperature of the oil of the motor is equal to or less than a preset highest temperature of the motor oil. When both conditions are applied simultaneously, the constraint for recovering the waste heat of the vehicle parts 110 may be satisfied when the temperature of the oil of the motor is included in a range between the lowest temperature and the highest temperature of the motor oil.

In addition, when the vehicle part 110 includes a motor provided in the vehicle among the drive train **110*a* to provide driving force for traveling, the constraint for recovering the waste heat of the vehicle parts 110** may include a condition on the operation performance of the motor that is determined to be satisfied based on the winding temperature of the motor.

For example, the condition on the operation performance of the motor may include a condition that is satisfied when the winding temperature of the motor is higher than a preset lowest temperature of the motor oil. The condition on the operation performance of the motor may also include a condition that is satisfied when the winding temperature of the motor is equal to or less than a preset highest temperature of the motor winding. When both conditions are applied simultaneously, the constraint for recovering the waste heat of the vehicle parts 110 may be satisfied when the winding temperature of the motor is included in a range between the lowest temperature and the highest temperature of the motor winding.

In addition, when the vehicle parts 110 include an inverter provided in the vehicle among the drive train **110*a* to perform power conversion, the constraint for recovering the waste heat of the vehicle parts 110** may include a condition on the operation performance of the inverter, which is determined to be satisfied based on a temperature of an element driving the inverter.

For example, the condition on the operation performance of the inverter may include a condition that is satisfied when the temperature of the element driving the inverter is higher than a preset lowest temperature of the element. The condition on the operation performance of the inverter may also include a condition that is satisfied when the temperature of the element of the inverter is equal to or less than a preset highest temperature of the element. When both conditions are applied simultaneously, the constraint for recovering the waste heat of the vehicle parts 110 may be satisfied when the temperature of the element of the inverter is included in a range between the lowest temperature and the highest temperature of the element.

Therefore, it is possible to prevent the thermal management on the motor from being disturbed in the process of performing indoor heating by recovering the waste heat of the drive train **110*a*. It is also possible to prevent a situation in which the control may not be performed according to the optimal control value for the thermal management of the drive train 110*a***.

In addition, when the vehicle parts 110 include the battery 110*b* provided in the vehicle to store power, the constraint for recovering the waste heat of the vehicle parts 110 may include a condition on the operation performance of the battery, which is determined to be satisfied based on a cell temperature of the battery 110*b*.

For example, the condition on the operation performance of the battery 110*b* may include a condition that is satisfied when the cell temperature of the battery 110*b* is higher than a preset lowest temperature of the battery cell. The condition on the operation performance of the battery 110*b* may also include a condition that is satisfied when the cell temperature of the battery 110*b* is equal to or lower than a preset highest temperature of the battery cell. When both conditions are applied simultaneously, the constraint for recovering the waste heat of the vehicle parts 110 may be satisfied when the temperature of the battery cell 110*b* is included in a range between the lowest temperature and the highest temperature of the battery cell.

Therefore, it is possible to prevent the thermal management of the battery 110*b* from being disturbed in the process of performing indoor heating by recovering the waste heat of the battery 110*b*. It is also possible to prevent a situation in which the control may not be performed according to the optimal control value for the thermal management of the battery 110*b*.

Meanwhile, in addition to the drive train 110*a* and the battery 110*b*, the vehicle parts 110 may include various components that require heat dissipation, for example, the vehicle parts 110 may include a controller provided in the vehicle to perform control of performing a specific function. In this case, the constraint for recovering the waste heat of the vehicle parts 110 may include a condition on the operation performance of the controller, which is determined to be satisfied based on a temperature of the controller.

As described above, for the thermal management of the vehicle parts 110, in determining the constraint for recovering the waste heat, a control margin may be applied to ensure thermal management stability on the vehicle parts 110. Taking the condition on the operation performance of the battery 110*b* as an example, when the cell temperature of the battery 110*b* is lower than a value summing the preset minimum temperature of the cell with the control margin, the condition on the operation performance of the battery 110*b* may be made to be satisfied to prevent the cell temperature of the battery 110*b* from falling below the minimum temperature of the cell.

Meanwhile, in addition to performing model-based optimal control as described above, the control unit 200 may also perform thermal management through rule-based control.

For example, when the fluid transfer device 100 includes the opening and closing device 174 that regulates the air flow inside the fluid transfer device according to the amount of opening, the control unit 200 may control the amount of opening of the opening and closing device based on the temperature of the air discharged into the vehicle interior. More specifically, the opening and closing device 174 may be a temp door that regulates a degree to which cooled air on the evaporator 156 side is introduced into the vehicle interior. In this case, the control unit 200 may increase the amount of opening of the temp door such that when the amount of heat through waste heat recovery and the like remains even after the temperature of the air discharged into the vehicle interior reaches the target temperature, the degree to which the cooled air on the evaporator 156 side is introduced into the vehicle interior increases.

Meanwhile, while the description so far has focused on thermal management of the vehicle interior, particularly indoor heating, through the optimal control value, the control unit 200 may perform the thermal management for the vehicle parts together by adjusting the heat transfer path between the fluid transfer device 100 and the vehicle parts 110 based on the temperature of the vehicle parts 110. In this case, the heat transfer path may be adjusted by regulating the circulation of the coolant in the coolant lines CL1 and CL2, as described with reference to FIG. 1, for example. To this end, the control unit 200 may control the operation of the valves 141 and 142, the pumps 121 and 122, and the like.

Hereinafter, the thermal management process of the vehicle described so far is described with reference to the flowchart.

Figure 4:
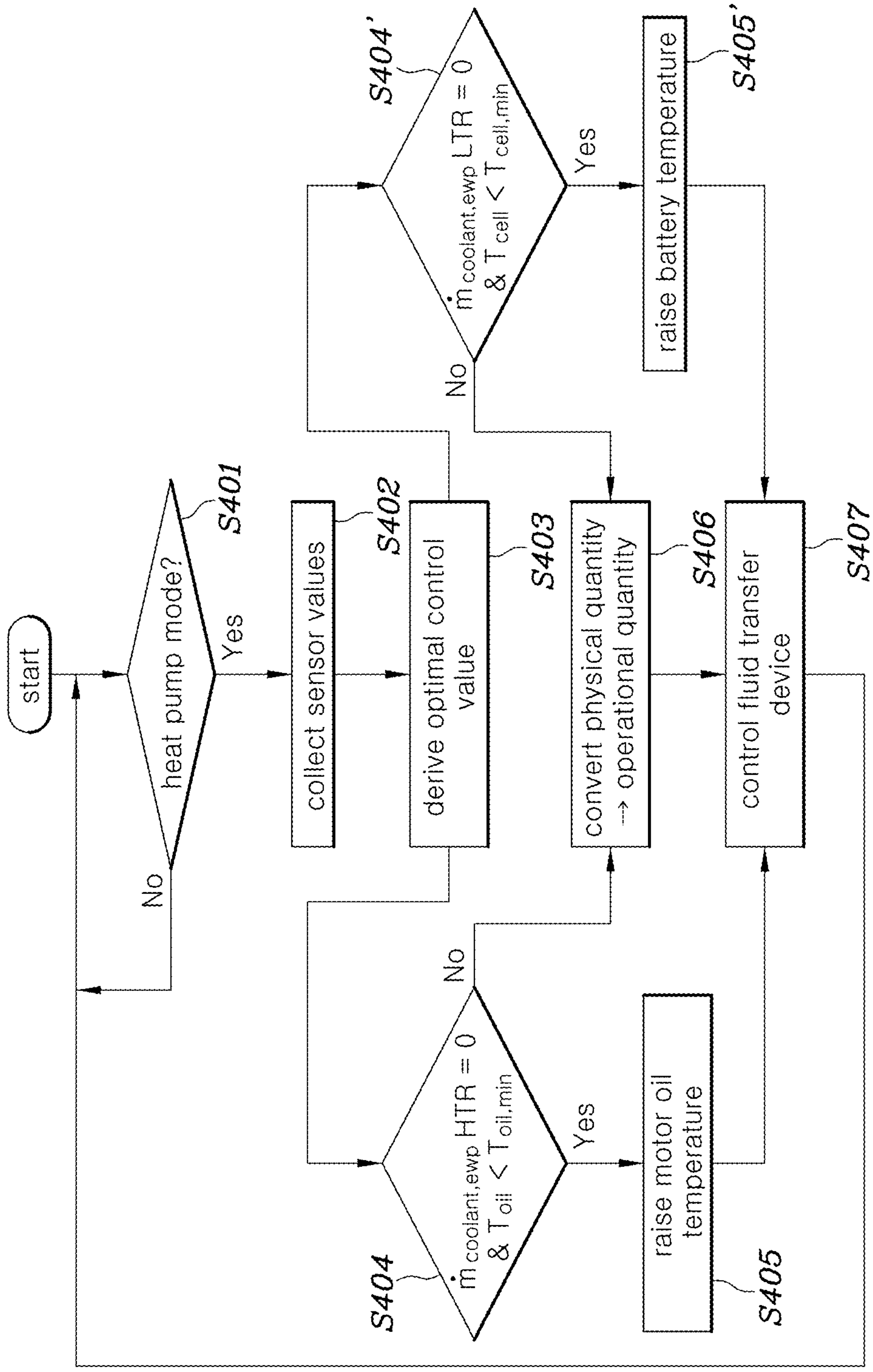
FIG. 4 is a flowchart for describing a process of performing thermal management of a vehicle according to one embodiment of the present disclosure.

FIG. 4 is a flowchart for describing a process of performing thermal management of a vehicle according to one embodiment of the present disclosure.

With reference to FIG. 4, the control unit 200 may determine whether a heat pump mode is performed (S401). The control unit 200 may collect sensor values on configurations of the fluid transfer device 100 that are subject to be controlled (S402) when the heat pump mode is performed (Yes in S401), i.e., when the refrigerant is circulating on the refrigerant line NL for the thermal management of the vehicle interior. In this case, the collected sensor value may be an operational quantity for each configuration and may be converted to a physical quantity as needed to derive the optimal control value.

The control unit 200 may determine a current state value, a disturbance, and the like based on the collected sensor values, and may derive the optimal control value for the control of the configurations of the fluid transfer device 100 that are subject to be controlled. Specifically, the power consumption unit 101 uses the model for the predicted state value, the cost function, and the like described above (S403).

When the derived optimal control value is a physical quantity, the control unit 200 may convert the optimal control value to an operational quantity (S406) and finally may perform indoor heating by controlling each configuration of the fluid transfer device 100 based on the optimal control value (S407).

Meanwhile, the control unit 200 may perform the thermal management for the vehicle parts 110, such as the drive train 110*a*, the battery 110*b*, and the like, according to the derived result of the optimal control value, together with the thermal management for indoor heating. The control unit 200 may determine whether the temperature of the oil of the motor is lower than a preset lowest temperature of the oil (S404). The control unit 200 may determine whether the cell temperature of the battery 110*b* is lower than a preset lowest cell temperature (S404').

For example, when the optimal control value includes a coolant flow rate of the coolant pump 121, the optimal control value($\dot{m}_{coolant,ewp}$HTR) for the coolant flow rate derived by reflecting the condition on the viscosity of the oil of the motor is determined to be 0 (i.e., the waste heat of the motor is unrecoverable), and when the temperature of the oil of the motor is lower than the preset lowest temperature of the oil (Yes in S404), the control unit 200 may enter a motor oil temperature raising mode as thermal management to maintain the viscosity of the oil of the motor in an appropriate range (S405). In this case, the control unit 200 may control the pump 121, the valve 141, and the like provided in the coolant line CL1 of the fluid transfer device 100 to raise the temperature of the oil of the motor.

In addition, when the optimal control value includes a coolant flow rate of the coolant pump 122, the optimal control value ($\dot{m}_{coolant,ewp}$LTR) for the coolant flow rate derived by reflecting the condition on the operation performance of the battery 110*b* is determined to be 0 (i.e., the waste heat of the motor is unrecoverable), and when the cell temperature of the battery 110*b* is lower than the preset lowest cell temperature (Yes in S404'), the control unit 200 may enter a battery temperature raising mode as thermal management to maintain the cell temperature of the battery 110*b* in an appropriate range (S405'). In this case, the control unit 200 may control the pump 122, the valve 142, the heater 162, and the like provided in the coolant line CL2 of the fluid transfer device 100 to raise the temperature of the battery.

According to various embodiments of the present disclosure as described above, it is possible to efficiently consume energy and achieve the indoor heating target by controlling the indoor heating in consideration of the waste heat recovery of the vehicle parts. Thus, the electricity efficiency of the vehicle and the traveling distance with respect to a charging amount may be increased.

In addition, in performing the indoor heating as described above, because the constraint for the thermal management of the vehicle parts is reflected, the requirements in terms of thermal management for the vehicle parts can be satisfied.

The effects capable of being obtained by the present disclosure are not limited to the aforementioned effects, and other effects, which are not mentioned above, should be clearly understood by those having ordinary skill in the art from the following description.

While the specific embodiments of the present disclosure have been illustrated and described above, it should be apparent to those having ordinary skill in the art that the present disclosure may be variously modified and changed without departing from the technical spirit of the present disclosure defined in the appended claims.

What is claimed is:

1. A thermal management system for a vehicle, the thermal management system comprising:

a fluid transfer device configured to perform a heat pump function of exchanging heat with at least one vehicle part to selectively recover waste heat of the at least one vehicle part and discharging air into a vehicle interior to perform indoor heating, the fluid transfer device including a power consumption unit configured to consume power for performing the heat pump function; and a control unit configured to control the fluid transfer device based on an optimal control value derived using a control model for a predicted state value according to a current state value, wherein the optimal control value is a control value that allows the fluid transfer device to create a target discharge air temperature for indoor heating while consuming minimum power through the power consumption unit and satisfying a constraint for recovering the waste heat of the at least one vehicle part.

2. The thermal management system for the vehicle of claim 1, wherein at least one of an effect according to a current control value or an effect of a disturbance on a current output value is further reflected in the control model for the predicted state value.

3. The thermal management system for the vehicle of claim 1, wherein the control unit derives the optimal control value based on a target value that enables the fluid transfer device to perform the indoor heating with minimum power consumption through the power consumption unit, and wherein the target value is determined based on a power consumption according to a state value and a control value and a control model for an output value.

4. The thermal management system for the vehicle of claim 3, wherein the target value is determined in a normal state where there is no change in the state value.

5. The thermal management system for the vehicle of claim 3, wherein the control unit is configured to determine a control value that allows a cost function for a preset prediction range to be minimized, and wherein the cost function includes a state cost having a weight on the state value and a control input cost having a weight on the control value.

6. The thermal management system for the vehicle of claim 5, wherein at least one of a final state cost having a weight on a final state value of the preset prediction range or a cost on an amount of change of control having a weight on an amount of change of the control value is further reflected in the cost function.

7. The thermal management system for the vehicle of claim 5, wherein the optimal control value is derived from a dynamic state where there is a change in the state value.

8. The thermal management system for the vehicle of claim 1, wherein the optimal control value is a physical quantity that affects the indoor heating of the vehicle according to a result of an operation of the power consumption unit, and wherein the control unit is configured to:

convert the optimal control value into an operational quantity that determines the operation of the power consumption unit; and control the power consumption unit based on the operational quantity.

9. The thermal management system for the vehicle of claim 8, wherein the power consumption unit includes a coolant pump configured to flow coolant that cools the at least one vehicle part and a compressor configured to compress and discharge refrigerant that recovers the waste heat of the at least one vehicle part through the coolant, and wherein the optimal control value includes a mass flow rate of the coolant through the coolant pump and a mass flow rate of the refrigerant through the compressor.

10. The thermal management system for the vehicle of claim 9, wherein the power consumption unit includes a heater configured to heat air discharged into a vehicle interior of the vehicle, and wherein the optimal control value further includes power consumption of the heater.

11. The thermal management system for the vehicle of claim 9, wherein the fluid transfer device is configured to selectively absorb heat from air outside the vehicle according to a result of a waste heat recovery of the at least one vehicle part, wherein the power consumption unit further includes a fan configured to introduce air outside the vehicle into the fluid transfer device, and wherein the optimal control value further includes a mass flow rate of the outside air introduced into the fluid transfer device.

12. The thermal management system for the vehicle of claim 1, wherein the current state value and the predicted state value include a temperature of air discharged into the vehicle interior and a temperature of refrigerant circulating within the fluid transfer device to recover the waste heat of the at least one vehicle part.

13. The thermal management system for the vehicle of claim 12, wherein the current state value and the predicted state value further includes a state value on the temperature of the at least one vehicle part.

14. The thermal management system for the vehicle of claim 13, wherein the at least one vehicle part include a battery provided in the vehicle and configured to store power, and wherein the constraint for recovering the waste heat of the at least one vehicle part includes a condition on operation performance of the battery that is determined to be satisfied based on a cell temperature of the battery.

15. The thermal management system for the vehicle of claim 13, wherein the at least one vehicle part include a motor provided in the vehicle and configured to provide a driving force, and wherein the constraint for recovering the waste heat of the at least one vehicle part includes a condition on viscosity of oil of the motor that is determined to be satisfied based on a temperature of the oil of the motor.

16. The thermal management system for the vehicle of claim 13, wherein the at least one vehicle part include a motor provided in the vehicle and configured to provide a driving force, and wherein the constraint for recovering the waste heat of the at least one vehicle part includes a condition on operation performance of the motor that is determined to be satisfied based on a winding temperature of the motor.

17. The thermal management system for the vehicle of claim 13, wherein the at least one vehicle part include an inverter provided in the vehicle and configured to perform power conversion, and wherein the constraint for recovering the waste heat of the at least one vehicle part includes a condition on operation performance of the inverter that is determined to be satisfied based on a temperature of an element driving the inverter.

18. The thermal management system for the vehicle of claim 13, wherein the at least one vehicle part include a controller provided in the vehicle and configured to perform control of performing a specific function, and wherein the constraint for recovering the waste heat of the at least one vehicle part includes a condition on operation performance of the controller that is determined to be satisfied based on a temperature of the controller.

19. The thermal management system for the vehicle of claim 1, wherein the fluid transfer device further includes an opening and closing device configured to regulate air flow inside the fluid transfer device according to an amount of opening, and wherein the control unit is configured to control the amount of opening of the opening and closing device based on a temperature of air discharged into the vehicle interior.

20. The thermal management system for the vehicle of claim 1, wherein the control unit is configured to perform thermal management for the at least one vehicle part together by adjusting a heat transfer path between the fluid transfer device and the vehicle part based on a temperature of the vehicle part.

* * * * *